United States Patent
Kurihara et al.

(10) Patent No.: US 11,519,399 B2
(45) Date of Patent: Dec. 6, 2022

(54) CAPACITY CONTROL VALVE AND METHOD FOR CONTROLLING SAME

(71) Applicant: EAGLE INDUSTRY CO., LTD., Tokyo (JP)

(72) Inventors: Daichi Kurihara, Tokyo (JP); Kohei Fukudome, Tokyo (JP); Keigo Shirafuji, Tokyo (JP)

(73) Assignee: EAGLE INDUSTRY CO., LTD.

( * ) Notice: Subject to any disclaimer, the term of this patent is extended or adjusted under 35 U.S.C. 154(b) by 222 days.

(21) Appl. No.: 16/766,096

(22) PCT Filed: Dec. 7, 2018

(86) PCT No.: PCT/JP2018/045010
§ 371 (c)(1),
(2) Date: May 21, 2020

(87) PCT Pub. No.: WO2019/112025
PCT Pub. Date: Jun. 13, 2019

(65) Prior Publication Data
US 2020/0362840 A1 Nov. 19, 2020

(30) Foreign Application Priority Data

Dec. 8, 2017 (JP) .............................. JP2017-236536

(51) Int. Cl.
*F04B 27/18* (2006.01)
*F16K 31/06* (2006.01)
*F04B 49/22* (2006.01)

(52) U.S. Cl.
CPC .......... *F04B 27/1804* (2013.01); *F04B 27/18* (2013.01); *F04B 49/22* (2013.01);
(Continued)

(58) Field of Classification Search
CPC .......... F04B 27/1804; F04B 2027/1831; F04B 2027/1827; F04B 2027/1813;
(Continued)

(56) References Cited

U.S. PATENT DOCUMENTS

| 1,614,002 A | 1/1927 | Horton ................. A62C 35/605 |
| 2,267,515 A | 12/1941 | Wilcox |

(Continued)

FOREIGN PATENT DOCUMENTS

| CN | 111279076 | 6/2020 | ............. F04B 27/18 |
| CN | 111316028 | 6/2020 | ............. F16K 31/06 |

(Continued)

OTHER PUBLICATIONS

International Search Report (ISR) dated Feb. 26, 2019, issued for International application No. PCT/JP2018/045010. (1 page).
(Continued)

*Primary Examiner* — Peter J Bertheaud
(74) *Attorney, Agent, or Firm* — Hayes Soloway P.C.

(57) ABSTRACT

The purpose of the present invention is to provide a capacity control valve with which it is possible to efficiently discharge a liquid refrigerant irrespective of the pressure of a suction chamber. A capacity control valve (1) includes: a valve main body (10) having a first communication passage (11), a second communication passage (12), a third communication passage (13), and a main valve seat (15a); a valve body (20) having an intermediate communication passage (26), a main valve part (21b), and an auxiliary valve part (23d); and a solenoid (30) equipped with a first plunger (34) having a first rod (33), and a second plunger (35) having a second rod (36), the first rod (33) opens and closes the main valve part (21b), and the second rod (36) opens and closes the auxiliary valve part (23d).

19 Claims, 9 Drawing Sheets

(52) U.S. Cl.
CPC .......... *F16K 31/06* (2013.01); *F16K 31/0613* (2013.01); *F16K 31/0624* (2013.01); *F04B 2027/185* (2013.01); *F04B 2027/1813* (2013.01); *F04B 2027/1827* (2013.01); *F04B 2027/1831* (2013.01); *F04B 2027/1845* (2013.01); *F04B 2027/1854* (2013.01); *F04B 2027/1859* (2013.01); *F04B 2027/1863* (2013.01); *F04B 2027/1868* (2013.01); *F04B 2027/1872* (2013.01); *F04B 2027/1877* (2013.01); *F04B 2027/1881* (2013.01)

(58) Field of Classification Search
CPC ...... F04B 2027/1859; F04B 2027/1854; F04B 2027/185; F04B 2027/1845; F04B 2027/1877; F04B 49/22; F04B 2027/1863; F04B 2027/1881; F04B 2027/1868; F04B 2027/1872; F04B 27/18; F16K 31/06; F16K 31/0613; F16K 31/0624
See application file for complete search history.

(56) References Cited

U.S. PATENT DOCUMENTS

| | | | |
|---|---|---|---|
| 3,360,304 A | 12/1967 | Adams | |
| 3,483,888 A | 12/1969 | Hugo | F16K 15/046 |
| 4,364,615 A | 12/1982 | Euler | F16C 27/04 |
| 4,579,145 A | 4/1986 | Leiber | |
| 4,615,358 A | 10/1986 | Hammond | |
| 4,895,192 A | 1/1990 | Mortenson | |
| 4,917,150 A | 4/1990 | Koch | |
| 4,979,542 A | 12/1990 | Mesenich | |
| 4,998,559 A | 3/1991 | McAuliffe | |
| 5,060,695 A | 10/1991 | McCabe | |
| 5,217,047 A | 6/1993 | McCabe | |
| 5,263,694 A | 11/1993 | Smith | B60G 15/068 |
| 5,702,235 A * | 12/1997 | Hirota | F04B 27/1804 417/270 |
| 5,778,932 A | 7/1998 | Alexander | |
| 6,010,312 A * | 1/2000 | Suitou | F04B 27/1804 417/222.2 |
| 6,161,585 A | 12/2000 | Kolchinsky | |
| 6,361,283 B1 * | 3/2002 | Ota | F04B 27/1804 417/222.2 |
| 6,481,976 B2 * | 11/2002 | Kimura | F04B 27/1804 137/454.6 |
| 7,533,687 B2 * | 5/2009 | Uemura | F16K 27/048 251/129.15 |
| 8,021,124 B2 | 9/2011 | Umemura et al. | F04B 27/1804 |
| 8,079,827 B2 | 12/2011 | Iwa | F04B 27/1804 |
| 8,225,818 B1 | 7/2012 | Stephens | |
| 8,651,826 B2 | 2/2014 | Futakuchi | F04B 27/1804 |
| 9,022,346 B2 | 5/2015 | Najmolhoda | |
| 9,027,598 B2 | 5/2015 | Schneider | |
| 9,132,714 B2 | 9/2015 | Futakuchi | F04B 27/1804 |
| 9,297,373 B2 | 3/2016 | Bagagli | F16K 15/026 |
| 9,400,027 B2 | 7/2016 | Imaizumi | F16F 1/32 |
| 9,453,518 B2 | 9/2016 | Schulz | |
| 9,581,149 B2 | 2/2017 | Ota et al. | F04B 27/1804 |
| 9,581,150 B2 | 2/2017 | Ota et al. | F04B 27/1804 |
| 9,732,874 B2 | 8/2017 | Saeki | F16K 31/0603 |
| 9,874,286 B2 | 1/2018 | Bagagli | F16K 15/12 |
| 10,113,539 B2 | 10/2018 | Sugamura | F04B 27/1804 |
| 10,519,944 B2 | 12/2019 | Taguchi | F04B 27/1804 |
| 10,557,463 B2 | 2/2020 | Sugamura | |
| 10,690,125 B2 | 6/2020 | Hayama | |
| 10,784,804 B2 | 9/2020 | Sasaki | |
| 10,837,431 B2 | 11/2020 | Tonegawa | F04B 49/22 |
| 2001/0003573 A1 | 6/2001 | Kimura et al. | 417/222.2 |
| 2002/0134444 A1 | 9/2002 | Isobe | |
| 2003/0145615 A1 | 8/2003 | Sasaki | |
| 2003/0202885 A1 | 10/2003 | Taguchi | F04B 49/00 |
| 2004/0045305 A1 | 3/2004 | Murase | F25B 49/022 |
| 2004/0165994 A1 | 8/2004 | Umemura | F04B 27/1804 |
| 2005/0076959 A1 | 4/2005 | Yamamoto | |
| 2005/0151310 A1 | 7/2005 | Rodeffer | F16F 1/32 |
| 2007/0214814 A1 | 9/2007 | Umemura et al. | |
| 2007/0264134 A1 | 11/2007 | Hirota | F04B 27/1804 |
| 2008/0138213 A1 | 6/2008 | Umemura et al. | 417/222.2 |
| 2008/0175727 A1 | 7/2008 | Umemura et al. | |
| 2009/0108221 A1 | 4/2009 | Umemura et al. | 251/129.15 |
| 2009/0114871 A1 | 5/2009 | Iwa | |
| 2009/0183786 A1 | 7/2009 | Iwa et al. | |
| 2009/0256091 A1 | 10/2009 | Nordstrom | |
| 2010/0282991 A1 | 11/2010 | Okamoto | |
| 2011/0061749 A1 | 3/2011 | Okamoto | |
| 2011/0089352 A1 | 4/2011 | Morgan | |
| 2012/0056113 A1 | 3/2012 | Tano | |
| 2012/0198992 A1 | 8/2012 | Futakuchi et al. | 91/505 |
| 2012/0198993 A1 | 8/2012 | Fukudome | 91/505 |
| 2012/0211686 A1 | 8/2012 | Okamoto | |
| 2013/0291963 A1 | 11/2013 | Futakuchi et al. | 137/487.5 |
| 2014/0099214 A1 | 4/2014 | Fukudome | 417/222.2 |
| 2014/0130916 A1 | 5/2014 | Saeki | F16K 31/0613 |
| 2014/0294632 A1 | 10/2014 | Kondo et al. | 417/434 |
| 2014/0369862 A1 | 12/2014 | Ota et al. | F04B 27/1804 |
| 2015/0021131 A1 | 1/2015 | Wootten | F16F 9/348 |
| 2015/0027573 A1 | 1/2015 | Ochiai | |
| 2015/0044067 A1 | 2/2015 | Ota et al. | F04B 27/1804 |
| 2015/0068628 A1 | 3/2015 | Iwa | 137/625.65 |
| 2015/0104334 A1 | 4/2015 | Ota et al. | F04B 27/1804 |
| 2015/0275874 A1 | 10/2015 | Ota | |
| 2015/0345655 A1 | 12/2015 | Higashidozono et al. | |
| 2016/0053755 A1 | 2/2016 | Taguchi | |
| 2016/0290326 A1 | 10/2016 | Sugamura | F04B 27/1804 |
| 2017/0284562 A1 | 10/2017 | Hayama | |
| 2018/0156345 A1 | 6/2018 | Kanda | |
| 2018/0187793 A1 | 7/2018 | Futakuchi | |
| 2018/0291888 A1 | 10/2018 | Tonegawa et al. | F04B 49/22 |
| 2019/0162175 A1 | 5/2019 | Higashidozono | |
| 2020/0032781 A1 | 1/2020 | Higashidozono | |
| 2020/0309105 A1 | 10/2020 | Hayama et al. | |
| 2020/0318624 A1 | 10/2020 | Hayama | |
| 2020/0332786 A1 | 10/2020 | Hayama | |
| 2020/0362974 A1 | 11/2020 | Hayama et al. | |
| 2020/0370545 A1 | 11/2020 | Hayama et al. | |
| 2021/0372396 A1 | 12/2021 | Kurihara | |

FOREIGN PATENT DOCUMENTS

| | | | |
|---|---|---|---|
| CN | 111417780 | 7/2020 | F04B 27/18 |
| EP | 2594794 | 5/2013 | F04B 27/18 |
| EP | 3726054 | 10/2020 | F04B 27/18 |
| JP | 6-26454 | 2/1994 | F04B 27/08 |
| JP | 2001165055 | 6/2001 | F04B 27/14 |
| JP | 2004003468 | 1/2004 | F04B 27/14 |
| JP | 2005307817 | 11/2005 | F04B 27/14 |
| JP | 2007247512 | 9/2007 | F04B 27/14 |
| JP | 2008157031 | 7/2008 | F04B 27/14 |
| JP | 2009275550 | 11/2009 | F04B 49/00 |
| JP | 2012144986 | 8/2012 | F04B 27/14 |
| JP | 2012211579 | 11/2012 | F04B 27/14 |
| JP | 5167121 B2 | 3/2013 | |
| JP | 2014080927 | 5/2014 | F04B 27/16 |
| JP | 2014092207 | 5/2014 | F16K 31/06 |
| JP | 2014095463 | 5/2014 | F16K 31/06 |
| JP | 2014194180 | 10/2014 | F04B 27/14 |
| JP | 201575054 | 4/2015 | F04B 27/14 |
| JP | 20151168 | 5/2015 | F04B 27/14 |
| JP | 2015137546 | 7/2015 | F04B 27/14 |
| JP | 2015178795 A | 10/2015 | |
| JP | 5983539 | 8/2016 | F04B 27/18 |
| JP | 2016196825 | 11/2016 | F04B 27/18 |
| JP | 2016196876 | 11/2016 | F04B 27/18 |
| JP | 2016205404 | 12/2016 | F04B 27/18 |
| JP | 6135521 | 5/2017 | F04B 27/18 |
| JP | 2017089832 | 5/2017 | F16K 31/06 |
| JP | 2018179087 | 11/2018 | F16K 31/06 |
| WO | WO2006090760 | 8/2006 | F04B 27/18 |
| WO | WO2007119380 | 10/2007 | F04B 27/14 |
| WO | 2009025298 A1 | 2/2009 | |
| WO | WO2011114841 | 9/2011 | F04B 27/14 |

(56) References Cited

FOREIGN PATENT DOCUMENTS

| WO | WO2012077439 | 6/2012 | ............ F04B 27/14 |
|---|---|---|---|
| WO | 2014119594 A1 | 8/2014 | |
| WO | WO2014148367 | 9/2014 | ............ F16K 31/06 |

OTHER PUBLICATIONS

The First Office Action issued in Chinese Patent Appln. Serial No. 201880081296,0, dated Jul. 5, 2021, with English translation, 9 pages.
Extended European Search Report issued in European Patent Appln. Serial No. 18896700.4, dated Aug. 12, 2021, 8 pages.
European Official Action issued in related European Patent Application Serial No. 18885296.6, dated Jan. 21, 2022, 4 pages.
International Preliminary Report on Patentability issued in PCT/JP2018/047716, dated Jun. 30, 2020, 8 pages.
International Search Report and Written Opinion issued in PCT/JP2018/047716, dated Mar. 26, 2019, with English translation, 14 pages.
International Preliminary Report on Patentability issued in PCT/JP2014/051901, dated Aug. 13, 2015, 7 pages.
International Search Report issued in PCT/JP2014/051901, dated Apr. 18, 2014, 4 pages.
International Preliminary Report on Patentability, International Search Report and Written Opinion issued in PCT/JP2019/045731, dated Feb. 4, 2020, 21 pages.
International Search Report issued in PCT/JP2018/004500, dated May 15, 2018, 12 pages.
International Preliminary Report on Patentability issued in PCT/JP2018/004500, dated Aug. 20, 2019, 4pages.
International Search Report issued in PCT/JP2018/041768, dated Jan. 22, 2019, 12 pages.
International Preliminary Report on Patentability issued in PCT/JP2018/041768, dated May 19, 2020, 6 pages.
International Search Report issued in PCT/JP2018/002084, dated Apr. 17, 2018, 11 pages.
International Preliminary Report on Patentability issued in PCT/JP2018/002084, dated Jul. 30, 2019, 4 pages.
International Search Report issued in PCT/JP2018/047693, dated Mar. 19, 2019, 11 pages.
International Preliminary Report on Patentability issued in PCT/JP2018/047693, dated Jun. 30, 2020, 4 pages.
International Search Report issued in PCT/JP2018/047694, dated Mar. 19, 2019, 20 pages.
International Preliminary Report on Patentability issued in PCT/JP2018/047694, dated Jun. 30, 2020, 7 pages.
International Search Report issued in PCT/JP2018/045010, dated Feb. 26, 2019, 11 pages.
International Preliminary Report on Patentability issued in PCT/JP2018/045010, dated Jun. 9, 2020, 4 pages.
International Search Report issued in PCT/JP2019/001569, dated Apr. 16, 2019, 20 pages.
International Preliminary Report on Patentability issued in PCT/JP2019/001569, dated Oct. 15, 2018, 7 pages.
Official Action issued in related U.S. Appl. No. 16/957,340, dated Feb. 4, 2022 (18 pgs).
Official Action issued in related U.S. Appl. No, 16/957,340, dated Sep. 20, 2021 (18 pgs).
Notice of Allowance issued in related U.S. Appl. No. 16/961,620, dated Feb. 9, 2022 (6 pgs).
Notice of Allowance issued in related U.S. Appl. No. 16/772,703, dated Oct. 13, 2021 (5 pgs).
Official Action issued in related U.S. Appl. No. 16/961,620, dated Aug. 5, 2021 (7 pgs).
Official Action issued in related U.S. Appl. No. 17/293,435, dated Nov. 23, 2021 (12 pgs).
European Official Action issued in related European Patent Applicaiton Serial No. 18897846.4, dated Apr. 14, 2022 (5 pgs).
European Official Action issued in related European Patent Applicaiton Serial No. 19890548.1, dated May 24, 2022 (6 pgs).
European Official Action issued in related European Patent Applicaiton Serial No. 18884020.1, dated Jun. 28, 2022 (4 pgs).
Korean Official Action issued in related Korean Patent Application Serial No. 10-2020-7013914, dated Mar. 15, 2022 (5 pgs).
Chinese Office Action issued in Chinese Patent Appln. Serial No. 201880080867.9, dated March 16, 2022, with English translation, 13 pages.
Chinese Office Action issued in Chinese Patent Appln. Serial No. 201880072030.X, dated Jun. 6, 2022, with English translation, 12 pages.
Chinese Office Action issued in Chinese Patent Appln. Serial No. 201980075007.0, dated Jun. 6, 2022, with English translation, 8 pages.
Japanese Office Action issued in Japanese Patent Appln. Serial No. 2019-562060, dated May 10, 2022, with English translation, 8 pages.
Japanese Office Action issued in Japanese Patent Appln. Serial No. 2019-562061, dated May 10, 2022, with English translation, 10 pages.
Japanese Office Action issued in Japanese Patent Appln. Serial No. 2019-559188, dated July 13, 2022, with English translation, 9 pages.
International Search Report and Written Opinion with translation issued in PCT/JP2019/001570, dated July 25, 2019 (19 pages).
International Preliminary Report on Patentability with translation issued in PCT/JP2019/001570, dated July 28, 2020 (6 pages).
International Search Report and Written Opinion with translation issued in PCT/JP2018/043652, dated Feb. 19, 2019 (21 pages).
International Preliminary Report on Patentability with translation issued in PCT/JP2018/043652, dated Jun. 2, 2020 (7 pages).
International Search Report and Written Opinion with translation issued in PCT/JP2018/045782, dated Feb. 26, 2019 (11 pages).
International Preliminary Report on Patentability with translation issued in PCT/JP2018/045782, dated Jun. 16, 2020 (4 pages).
Official Action issued in related U.S. Appl. No. 16/772,703, dated Jul. 21, 2021 (6 pgs).
Official Action issued in related U.S. Appl. No. 17/293,435, dated May 31, 2022 (11 pgs).
Official Action issued in related U.S. Appl. No. 16/961,627, dated Oct. 26, 2021 (24 pgs).
Official Action issued in related U.S. Appl. No. 16/766,124, dated Oct. 27, 2021 (11 pgs).
Notice of Allowance issued in related U.S. Appl. No. 16/766,124, dated Apr. 4, 2022 (5 pgs).
Notice of Allowance issued in related U.S. Appl. No. 16/957,340, dated May 24, 2022 (16 pgs).
Notice of Allowance issued in related U.S. Appl. No. 16/961,627, dated May 5, 2022 (19 pgs).
Official Action issued in related U.S. Appl. No. 16/957,344, dated Mar. 29, 2022 (19 pgs).
Official Action issued in related U.S. Appl. No. 16/763,800, dated Jun. 8, 2022 (9 pgs).
Official Action issued in related U.S. Appl. No. 16/480,281, dated Jun. 8, 2022 (15 pgs).
Official Action issued in related U.S. Appl. No. 16/771,548, dated Dec. 8, 2021 (15 pgs).
Official Action issued in related U.S. Appl. No. 16/771,548, dated Jun. 7, 2022 (11 pgs).
Official Action issued in related U.S. Appl. No. 16,483,621, dated Jun. 17, 2022 (13 pgs).

\* cited by examiner

FIG. 7
(a)
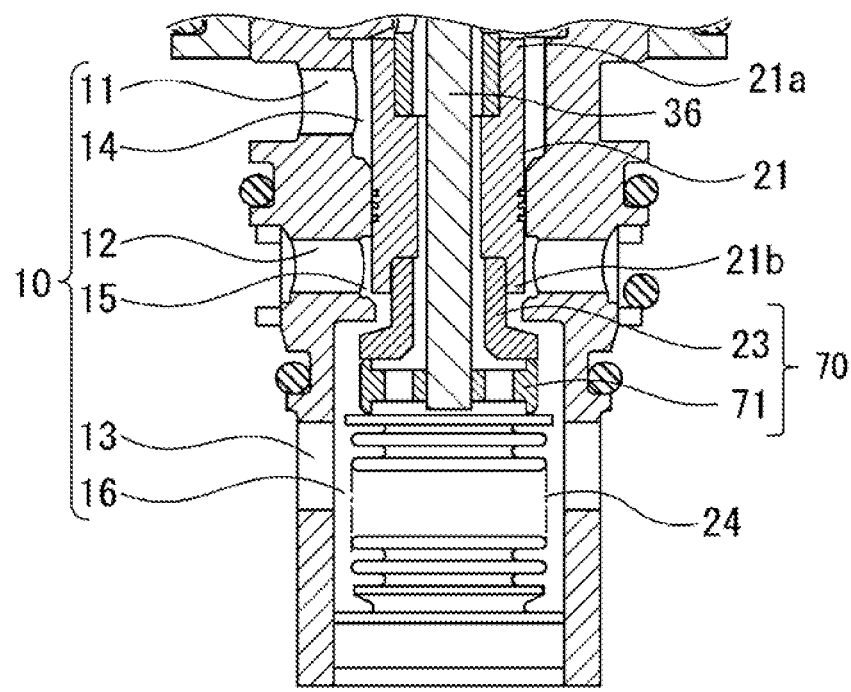
(b)
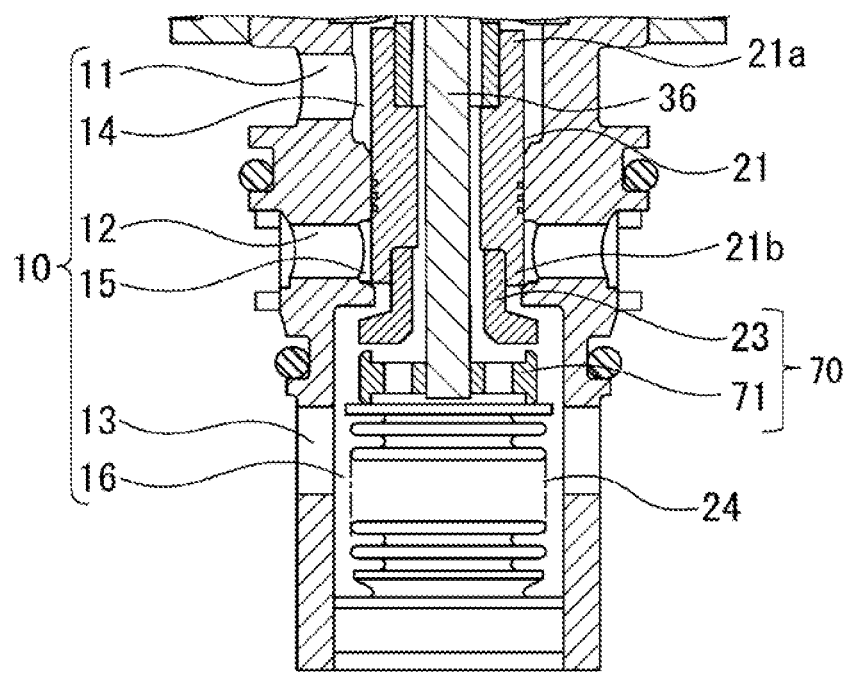

CAPACITY CONTROL VALVE AND METHOD FOR CONTROLLING SAME

CROSS-REFERENCE TO RELATED APPLICATIONS

This application is the U.S. National Phase under 35 U.S.C. § 371 of International Application PCT/JP2018/045010, filed Dec. 7, 2018, which claims priority to Japanese Patent Application No. 2017-236536, filed Dec. 8, 2017. The International Application was published under PCT Article 21(2) in a language other than English.

TECHNICAL FIELD

The present invention relates to a capacity control valve used for controlling a flow rate or pressure of a variable capacity compressor, and a method for controlling the same.

BACKGROUND ART

As a variable capacity compressor, for example, a swash plate type variable capacity compressor used for an air-conditioning system for motor vehicle and the like includes a rotating shaft rotationally driven by the rotational force of an engine, a swash plate which is coupled to the rotating shaft so that its inclination angle may be varied, a piston for compression coupled to the swash plate, and the like, and changes the inclination angle of the swash plate, thereby changing a stroke of the piston and controlling a discharge rate of a refrigerant.

By appropriately controlling pressure within a control chamber and adjusting a balancing state of the pressure acting on the both surfaces of the piston by means of a capacity control valve which is driven to be opened or closed by electromagnetic force while utilizing a suction pressure of a suction chamber for suctioning a refrigerant, a discharge pressure of a discharge chamber for discharging the refrigerant pressurized by the piston, and a control chamber pressure of the control chamber (a crank chamber) containing the swash plate, the inclination angle of the swash plate can be continuously changed.

An example of such a capacity control valve is shown in FIG. 8. A capacity control valve 160 includes: a valve section 170 having a second valve chamber 182 communicating with a discharge chamber of a compressor via a second communication passage 173, a first valve chamber 183 communicating with a suction chamber via a first communication passage 171, and a third valve chamber 184 communicating with a control chamber via a third communication passage 174; a pressure-sensitive body 178 which is arranged in the third valve chamber to extend and contract by ambient pressure and which has a valve seat body 180 provided at a free end in an extension and contraction direction; a valve body 181 having a second valve part 176 for opening and closing a valve hole 177 for communicating the second valve chamber 182 and the third valve chamber 184, a first valve part 175 for opening and closing the first communication passage 171 and a circulation groove 172, and a third valve part 179 for opening and closing the third valve chamber 184 and the circulation groove 172 by engagement and disengagement to and from the valve seat body 180 in the third valve chamber 184; a solenoid section 190 for exerting an electromagnetic driving force on the valve body 181, and the like.

Then, in the control capacity valve 160, without providing a clutch mechanism in a variable capacity compressor, a pressure in the control chamber (a control chamber pressure) Pc and a suction pressure Ps (a suction pressure) can be adjusted by communicating the discharge chamber and the control chamber in a case where the need to change the control chamber pressure arises (Hereinafter, it is referred to as a "conventional art". For example, see Patent Document 1.).

CITATION LIST

Patent Document

Patent Document 1: JP 5167121 B

SUMMARY OF THE INVENTION

Problem to be Solved by the Invention

In the conventional art, if the swash plate type variable capacity compressor is stopped for a long time, a liquid refrigerant (the refrigerant which is liquefied by being cooled during standing) is accumulated in the control chamber (crank chamber), and therefore a set discharge rate cannot be secured even if the compressor is started in this state. Therefore, in order to perform a desired capacity control just after start-up, the liquid refrigerant in the control chamber (crank chamber) needs to be discharged as quickly as possible.

Thus, as shown in FIG. 9, the conventional capacity control valve 160 includes a liquid refrigerant discharge function in order to discharge the liquid refrigerant in the control chamber (crank chamber) as quickly as possible at the time of start-up. That is, if the variable capacity compressor is stopped and then is intended to be started after a long-time standing, high-pressure liquid refrigerant accumulated in the control chamber (crank chamber) flows into the third valve chamber 184 from the third communication passage 174. Then, the pressure-sensitive body (bellows) 178 contracts and the third valve part 179 and the valve seat body 180 are opened therebetween, and the liquid refrigerant is discharged to the discharge chamber via the suction chamber out of the control chamber (crank chamber) through the auxiliary communication passage 185, a communication passage 186 and the circulation groove 172 from the third valve chamber 184 and is vaporized rapidly, thereby capable of achieving a cooling operation state in a short time.

However, in the above-described conventional art, in the early liquid refrigerant discharge process, the opening of the third valve part 179 is large because the pressure of the control chamber is high, and it is possible to efficiently discharge the liquid refrigerant. However, the opening of the third valve part is reduced as discharge of the liquid refrigerant is advanced and the pressure of the control chamber is reduced, and therefore there was a problem that it takes time to discharge the liquid refrigerant.

The present invention has been made to solve the problem the above-described conventional art has, and an object thereof is to provide, in a capacity control valve for controlling a flow rate or pressure of a variable capacity compressor according to a valve opening of a valve section, the capacity control valve with which it is possible to efficiently discharge a liquid refrigerant irrespective of the pressure of a suction chamber and shift to a cooling operation in a short time, and a method for controlling the same.

Means for Solving Problem

To attain the above object, a capacity control valve according to a first aspect of the present invention is a capacity control valve for controlling a flow rate or pressure of a variable capacity compressor according to a valve opening of a valve section, and the capacity control valve includes:

a valve main body having a first communication passage through which a fluid at a first pressure passes, a second communication passage which is arranged adjacent to the first communication passage and through which a fluid at a second pressure passes, a third communication passage through which a fluid at a third pressure passes, and a main valve seat arranged in a valve hole for communicating the second communication passage and the third communication passage;

a pressure-sensitive body which is arranged in the valve main body on the third communication passage side and which extends and contracts in response to ambient pressure;

a valve body having an intermediate communication passage for communicating the first communication passage and the third communication passage, a main valve part for opening and closing the valve hole by separating from and contacting the main valve seat, and an auxiliary valve part arranged in the intermediate communication passage; and a solenoid including a first plunger having a first rod, and a second plunger having a second rod, and is characterized in that the first rod opens and closes the main valve part and the second rod opens and closes the auxiliary valve part.

According to the first aspect, the main valve part opened and closed by the first rod and the auxiliary valve part opened and closed by the second rod can be opened and closed individually, and therefore the auxiliary valve part can maintain the opening of the auxiliary valve part at a fully open state from the start of discharge of liquid refrigerant to the completion of discharge of liquid refrigerant, thereby capable of efficiently discharging the liquid refrigerant.

The capacity control valve according to a second aspect of the present invention is characterized in that the first plunger is arranged between the second plunger and the valve main body.

According to the second aspect, it is possible to drive the first plunger firstly and drive the second plunger subsequently.

The capacity control valve according to a third aspect of the present invention is characterized in that the second rod is arranged in the intermediate communication passage.

According to the third aspect, it is possible to miniaturize the capacity control valve because it is possible to arrange the second rod with the use of the intermediate communication passage.

The capacity control valve according to a fourth aspect of the present invention is characterized in that:

the solenoid further includes a plate, a core arranged between the second plunger and the valve main body, an electromagnetic coil arranged between the plate and the core, a first biasing member arranged between the core and the first plunger, and a second biasing member arranged between the first plunger and the second plunger; and a biasing force of the second biasing member is larger than a biasing force of the first biasing member.

According to the fourth aspect, it is possible to drive the first plunger and the second plunger individually according to magnitude of current.

The capacity control valve according to a fifth aspect of the present invention is characterized in that the second plunger faces the plate in a radial direction.

According to the fifth aspect, it is possible to shorten the length of the capacity control valve and miniaturize it because it is possible to arrange the plate with the use of a space in an end part of the electromagnetic coil.

The capacity control valve according to a sixth aspect of the present invention is characterized in that the first plunger faces the plate in a radial direction.

According to the sixth aspect, it is possible to lower a magnetic resistance of a magnetic circuit passing the first plunger than a magnetic resistance of a magnetic circuit passing the second plunger, and it is possible to drive the first plunger almost without moving the second plunger.

The capacity control valve according to a seventh aspect of the present invention is characterized in that the auxiliary valve part opens and closes the intermediate communication passage by separating from and contacting the pressure-sensitive body.

According to the seventh aspect, the area of the auxiliary valve part can be increased with the use of the pressure-sensitive body, and the resistance at the time of discharge of liquid refrigerant can be reduced.

The capacity control valve according to an eighth aspect of the present invention is characterized in that the auxiliary valve part opens and closes the intermediate communication passage by separating from and contacting an auxiliary valve seat arranged at the second rod.

According to the eighth aspect, the capacity control valve can correspond to various variable capacity compressors.

The capacity control valve according to a ninth aspect or a tenth aspect of the present invention is characterized in that:

the first pressure is a suction pressure of the variable capacity compressor, the second pressure is a discharge pressure of the variable capacity compressor, and the third pressure is a pressure of a crank chamber of the variable capacity compressor; or the first pressure is the pressure of the crank chamber of the variable capacity compressor, the second pressure is the discharge pressure of the variable capacity compressor, and the third pressure is the suction pressure of the variable capacity compressor.

According to the ninth aspect and the tenth aspect, the capacity control valve can correspond to various variable capacity compressors.

To attain the above object, a method for controlling the capacity control valve according to an eleventh aspect of the present invention is characterized in that the main valve part and the auxiliary valve part are opened and closed individually.

According to the eleventh aspect, it is possible to select the function of the capacity control valve by opening and closing the main valve part and the auxiliary valve part individually.

To attain the above object, the method for controlling the capacity control valve according to a twelfth aspect of the present invention is characterized in that the main valve part and the auxiliary valve part are opened and closed individually according to current supplied to the solenoid.

According to the twelfth aspect, it is possible to control the variable capacity compressor by opening and closing the main valve part according to the current supplied to the solenoid and to discharge the liquid refrigerant by opening the auxiliary valve part only, and therefore it is possible to select the function of the capacity control valve according to the current.

BRIEF DESCRIPTION OF THE DRAWINGS

FIG. 7 is a diagram showing a modification of an auxiliary valve of the present invention, FIG. 7A shows a state that the auxiliary valve is closed, and FIG. 7B shows a state that the auxiliary valve is opened.

DESCRIPTION OF EMBODIMENTS

First Embodiment

Figure 1:
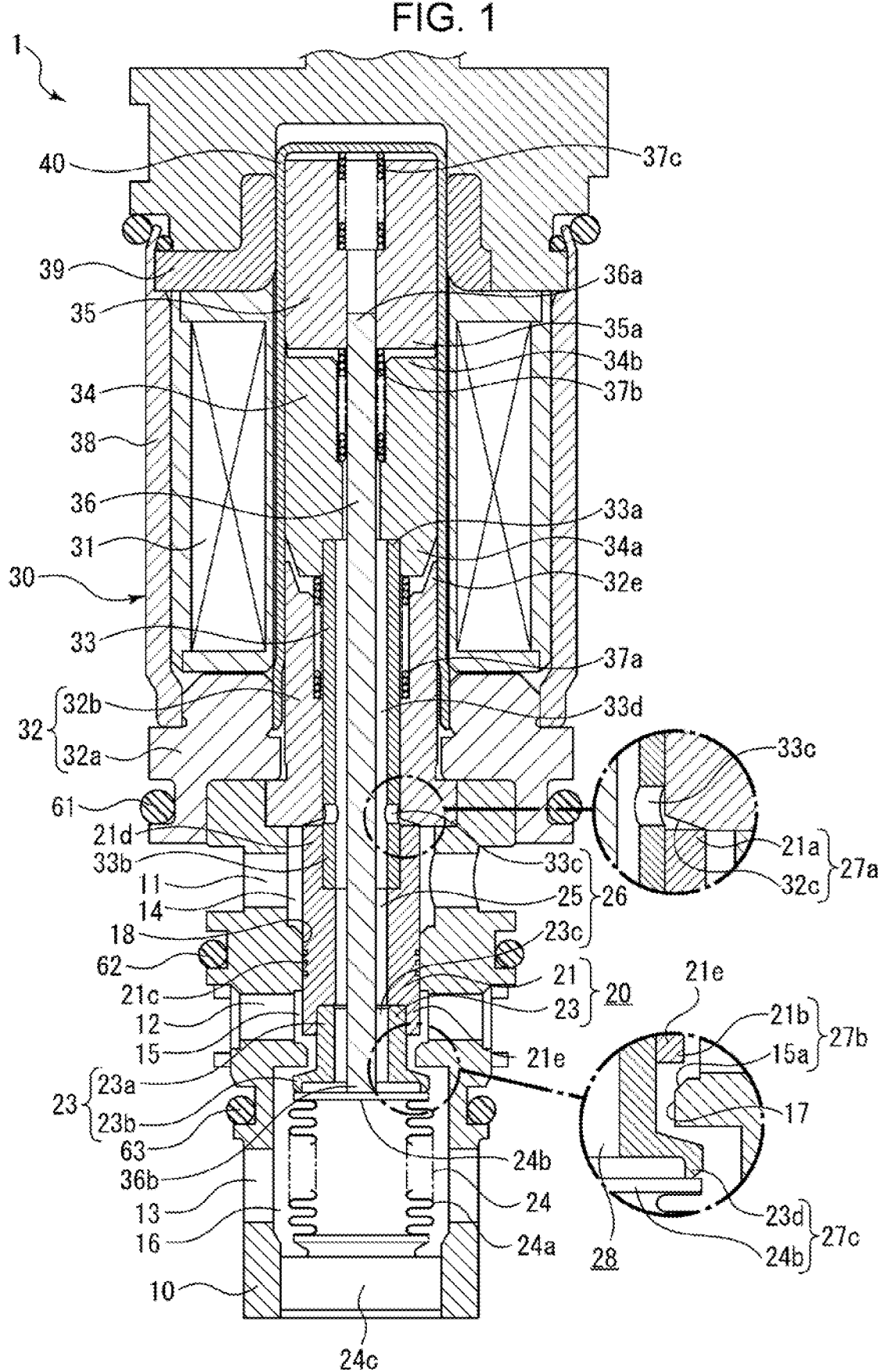
FIG. 1 is a front cross-sectional view of a capacity control valve according to a first embodiment of the present invention, and shows a state that the capacity control valve is OFF.

Hereinafter referring to the drawings, modes for carrying out the present invention will be described illustratively based on embodiments. However, the dimensions, materials, shapes, relative arrangements, and others of components described in the embodiments are not intended to limit the scope of the present invention only to them unless otherwise described explicitly.

Figure 2:
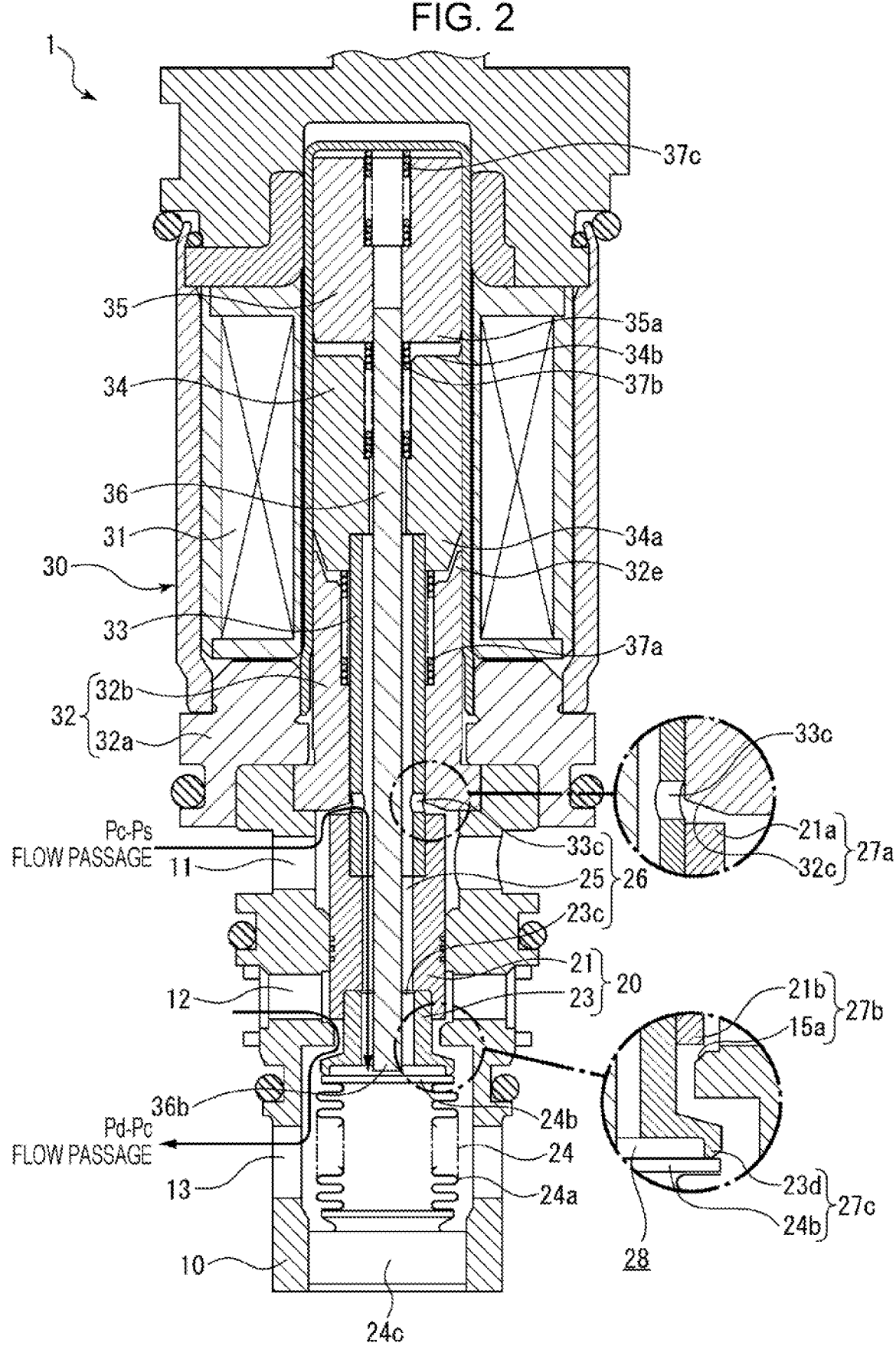
FIG. 2 is a front cross-sectional view of the capacity control valve according to the first embodiment of the present invention, and shows a state that the capacity control valve is controlled.
Figure 3:
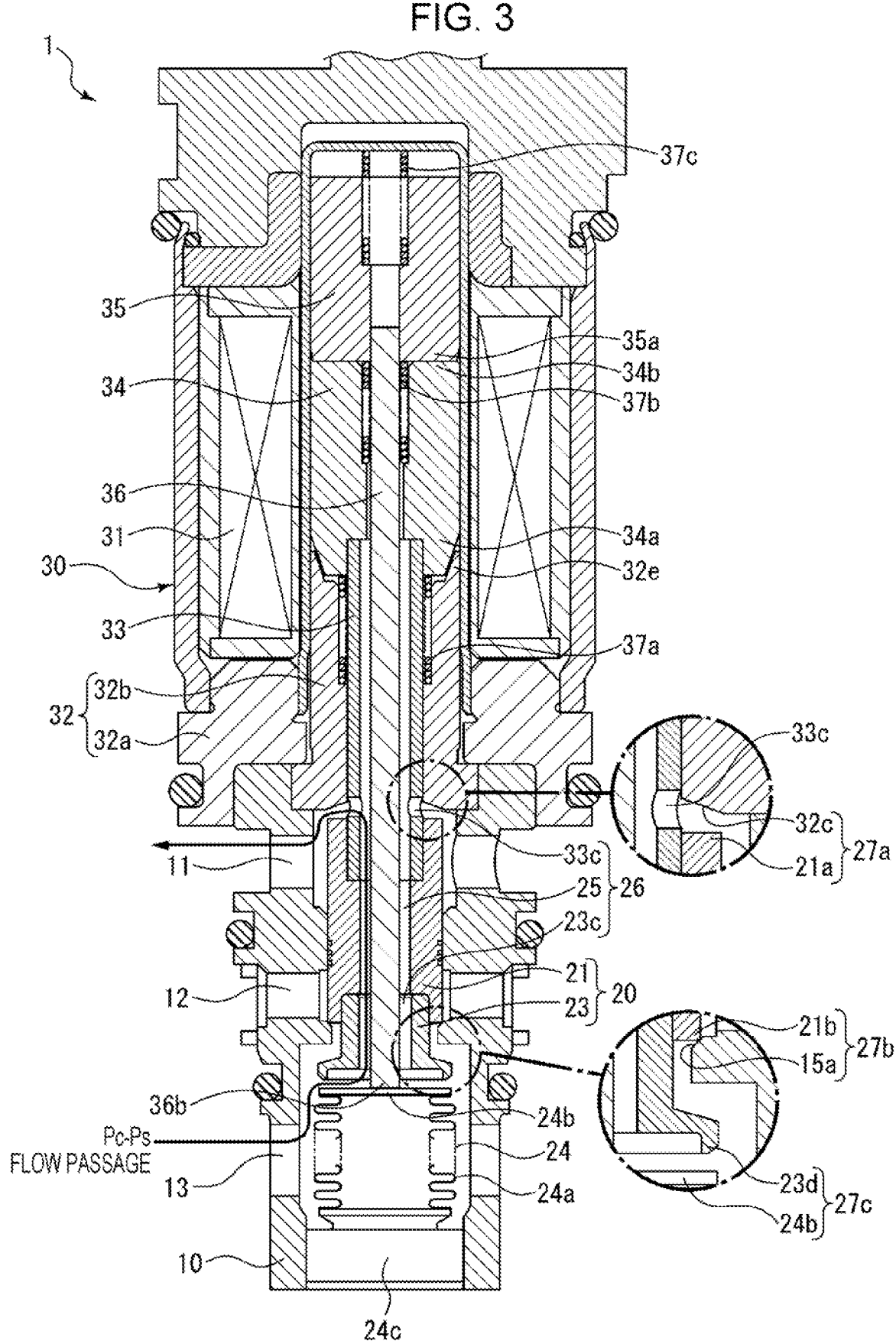
FIG. 3 is a front cross-sectional view of the capacity control valve according to the first embodiment of the present invention, and shows a state that the capacity control valve discharges a liquid refrigerant.

Referring to FIG. 1 to FIG. 3, a capacity control valve according to the present invention will be described. In FIG. 1, 1 denotes a capacity control valve. The capacity control valve 1 mainly consists of a valve main body 10, a valve body 20 arranged in the valve main body 10, a pressure-sensitive body 24, and a solenoid 30 mounted to the valve main body 10.

Hereinafter, each component of the capacity control valve 1 will be described with reference to FIG. 1. The valve main body 10 is composed of a metal such as brass, iron, aluminum, or stainless steel, a synthetic resin material, or the like. The valve main body 10 is a hollow cylindrical member having a through hole penetrating in an axial direction, and in a compartment of the through hole, a first valve chamber 14, a second valve chamber 15 adjacent to the first valve chamber 14, and a third valve chamber 16 adjacent to the second valve chamber 15 are sequentially arranged.

To the second valve chamber 15, a second communication passage 12 is consecutively provided. The second communication passage 12 is configured to communicate with a discharge chamber (not shown) of a variable capacity compressor such that a fluid at a discharge pressure Pd (a second pressure according to the present invention) can flow into the third valve chamber 16 from the second valve chamber 15 by opening and closing of the capacity control valve 1.

To the third valve chamber 16, a third communication passage 13 is consecutively provided. The third communication passage 13 is communicated with a control chamber (not shown) of the variable capacity compressor, and allows the fluid at the discharge pressure Pd flowed into the third valve chamber 16 from the second valve chamber 15 by opening and closing of the capacity control valve 1 to flow out to the control chamber (crank chamber) of the variable capacity compressor and allows the fluid at a control chamber pressure Pc (a third pressure according to the present invention) flowed into the third valve chamber 16 to flow out to a suction chamber of the variable capacity compressor through the first valve chamber 14 via an intermediate communication passage 26 described later.

Further, in the first valve chamber 14, a first communication passage 11 is consecutively provided. The first communication passage 11 guides the fluid at a suction pressure Ps (a first pressure according to the present invention) from the suction chamber of the variable capacity compressor to the pressure-sensitive body 24 via the intermediate communication passage 26 described later, and controls the suction pressure of the compressor to a set value.

Between the first valve chamber 14 communicating with the first communication passage 11 and the second valve chamber 15 communicating with the second communication passage 12, a hole part 18 having a smaller diameter than the diameters of these chambers is consecutively formed, and the hole part 18 slides with a labyrinth 21c of a main valve body 21 described later and forms a seal part which seals between the first valve chamber 14 and the second valve chamber 15. Moreover, between the second valve chamber 15 communicating with the second communication passage 12 and the third valve chamber 16 communicating with the third communication passage 13, a valve hole 17 having a smaller diameter than the diameters of these chambers is consecutively provided, and around the valve hole 17 on the second communication passage 12 side, a main valve seat 15a is formed. The main valve seat 15a controls opening/closing of communication between the second communication passage 12 and the third communication passage 13 by separating from and contacting a main valve part described later.

In the third valve chamber 16, the pressure-sensitive body 24 is arranged. In the pressure-sensitive body 24, one end part of a metallic bellows 24a is sealingly coupled to a partition adjustment part 24c. This bellows 24a is manufactured by phosphor bronze, stainless, or the like, and is designed such that its spring constant is a predetermined value. An interior space of the pressure-sensitive body 24 is a vacuum or air exists therein. Then, the pressure acts to an effective pressure receiving area of the bellows 24a of the pressure-sensitive body 24, and actuates the pressure-sensitive body 24 to be extended and contracted. On a free end part side of the pressure-sensitive body 24, a flange part 24b is arranged. The flange part 24b contacts a large diameter part 23b of an adapter 23 described later, and forms an interior space 28 surrounded by the pressure-sensitive body 24 and the adapter 23. As will be described later, the fluid at the suction pressure Ps from the suction chamber is guided to the interior space 28, and the pressure-sensitive body 24 extends and contracts according to the suction pressure Ps. Further, the flange part 24b is pressed by the solenoid force from a second rod 36 via the adapter 23, and the pressure-sensitive body 24 extends and contracts. That is, the pressure-sensitive body 24 extends and contracts by the suction pressure Ps and extends and contracts by the pressing force of the second rod 36.

The partition adjustment part 24c of the pressure-sensitive body 24 is sealingly fitted and fixed so as to block the third valve chamber 16 of the valve main body 10. In addition, if the partition adjustment part 24c is screwed, or fixed by a set screw (not shown), spring force of compression springs arranged in parallel within the bellows 24a or of the bellows 24a can be adjusted to be moved in the axial direction.

In addition, the first communication passage 11, the second communication passage 12, and the third communication passage 13 penetrate through a peripheral surface of the valve main body 10 respectively, for example, at two equal intervals to six equal intervals. Further, on an outer peripheral surface of the valve main body 10, mounting grooves for O-rings are provided at three positions apart from each other in the axial direction. Then, to the respective mounting grooves, O rings 61, 62, 63 to seal between the valve main body 10 and amounting hole (not shown) of a casing to which the valve main body 10 is fitted is mounted, and each of the first communication passage 11, the second communication passage 12, and the third communication passage 13 is configured as an independent flow passage.

Next, the valve body 20 will be described. The valve body 20 consists of the main valve body 21 and the adapter 23. Firstly, the main valve body 21 will be described. The main valve body 21 is a hollow cylindrical member, and in a nearly central part in the axial direction of an outer peripheral part thereof, the labyrinth 21c is formed. The labyrinth 21c slides with the hole part 18 between the first valve chamber 14 communicating with the first communication passage 11 and the second valve chamber 15 communicating with the second communication passage 12 and forms the seal part which seals the first valve chamber 14 and the second valve chamber 15. Thereby, the first valve chamber 14 and the second valve chamber 15 are configured as independent valve chambers. Moreover, in an interior of the main valve body 21, a through hole 25 penetrating in the axial direction is formed, and the through hole 25 constitutes the intermediate communication passage 26 described later.

The main valve body 21 is inserted in the valve main body 10, and the main valve body 21 is arranged across the labyrinth 21c on the first communication passage 11 side at one end thereof and on the second communication passage 12 side at the other end thereof. At the end part of the main valve body 21 arranged on the second communication passage 12 side, a main valve part 21b is formed, and the main valve part 21b controls opening/closing of a valve hole 17 for communicating the second communication passage 12 and the third communication passage 13 by separating from and contacting the main valve seat 15a. The main valve part 21b and the main valve seat 15a constitute a main valve 27b. Here, the state that the main valve part 21b and the main valve seat 15a shift from a contact state to a separated state means that the main valve 27b is opened or the main valve part 21b is opened, and the state that the main valve part 21b and the main valve seat 15a shift from the separated state to the contact state means that the main valve 27b is closed or the main valve part 21b is closed.

Moreover, at the end part of the main valve body 21 arranged on the first communication passage 11 side, a shutoff valve part 21a is formed. The shutoff valve part 21a contacts an end part 32c of a core 32 when the solenoid 30 described later is OFF, and shuts off communication between the first communication passage 11 and the intermediate communication passage 26. To the contrary, when the solenoid 30 is ON, the shutoff valve part 21a separates from the end part 32c of the core 32, and the first communication passage 11 and the intermediate communication passage 26 are communicated. The shutoff valve part 21a and the end part 32c of the core 32 constitute a shutoff valve 27a. The shutoff valve part 21a and the main valve part 21b are opened and closed oppositely to each other. In addition, the state that the shutoff valve part 21a and the end part 32c of the core 32 shift from the contact state to the separated state means that the shutoff valve 27a is opened or the shutoff valve part 21a is opened, and the state that the shutoff valve part 21a and the end part 32c of the core 32 shift from the separated state to the contact state means that the shutoff valve 27a is closed or the shutoff valve part 21a is closed.

Secondly, the adapter 23 constituting the valve body 20 will be described. The adapter 23 is a hollow cylindrical member, mainly consists of the large diameter part 23b formed to have a large diameter, and a tube part 23a formed to have a diameter smaller than that of the large diameter part 23b, and has an adapter through hole 23c penetrating the tube part 23a and the large diameter part 23b. The tube part 23a of the adapter 23 is fitted to a main valve side end part 21e of the main valve body 21, and the intermediate communication passage 26 is constituted by the adapter through hole 23c, the through hole 25 of the main valve body 21, and a communication hole 33c of a first rod 33 described later.

Moreover, at an end part of the large diameter part 23b of the adapter 23, an auxiliary valve part 23d is formed. The auxiliary valve part 23d contacts and separates from the flange part 24b of the pressure-sensitive body 24, and opens and closes the intermediate communication passage 26 for communicating the first communication passage 11 and the third communication passage 13. The auxiliary valve part 23d and the flange part 24b of the pressure-sensitive body 24 constitute an auxiliary valve 27c. In addition, the state that the auxiliary valve part 23d and the flange part 24b of the pressure-sensitive body 24 shift from the contact state to the separated state means that the auxiliary valve 27c is opened or the auxiliary valve part 23d is opened, and the state that the auxiliary valve part 23d and the flange part 24b of the pressure-sensitive body 24 shift from the separated state to the contact state means that the auxiliary valve 27c is closed or the auxiliary valve part 23d is closed.

In addition, the seal part diameter in the shutoff valve 27a, the seal part diameter in the main valve 27b, the seal part diameter in the labyrinth 21c of the main valve body 21, the seal part diameter in the auxiliary valve 27c, and the effective pressure receiving diameter in the bellows 24a are equally set.

Next, the solenoid 30 will be described. The solenoid 30 mainly consists of a first plunger 34 having the first rod 33, a second plunger 35 having the second rod 36, a plate 39, the core 32 arranged between the second plunger 35 and the valve main body, an electromagnetic coil 31 arranged between the plate 39 and the core 32, a spring 37a (a first biasing member according to the present invention) arranged between the core 32 and the first plunger 34, a spring 37b (a second biasing member according to the present invention) arranged between the first plunger 34 and the second plunger 35, a plunger case 40 which contains the first plunger 34 and the second plunger 35, and a solenoid case 38. The solenoid 30 is supplied with power from the outside via a terminal part (not shown), generates an electromagnetic force according to current, and drives the first plunger 34 connected to the first rod 33 and the second plunger 35 connected to the second rod 36. Hereinafter, the components constituting the solenoid 30 will be described.

The plunger case 40 is a bottomed hollow cylindrical member whose one end is opened. The core 32 consists of a base member 32a and a center post 32b. The plunger case 40 and the core 32 are fitted, and the first plunger 34 and the second plunger 35 are arranged relatively movably axially with respect to the plunger case 40 between the plunger case 40 and the center post 32b of the core 32. The first rod 33 is a hollow shaft part member, and has, in the vicinity of the shutoff valve 27a, the communication hole 33c in the radial direction. The communication hole 33c constitutes the intermediate communication passage 26 along with the through hole 25 of the main valve body 21 and the adapter through hole 23c.

The first rod 33 is arranged to penetrate the center post 32b of the core 32, a solenoid side end part 33a of the first rod 33 is fitted and fixed to a core side end part 34a of the first plunger 34, a valve side end part 33b is fitted and fixed to a shutoff valve part side end part 21d of the main valve body 21, and the first rod 33 relatively moves to the center post 32b and drives the main valve body 21. Moreover, the second rod 36 is arranged to penetrate the first plunger 34, the first rod 33 and the valve body 20, a solenoid side end part 36a of the second rod 36 is fitted to a second plunger end part 35a, a valve side end part 36b of the second rod 36 is arranged so as to be able to contact the flange part 24b of the pressure-sensitive body 24, and the second rod 36 relatively moves to the first plunger 34, the first rod 33 and the valve body 20, presses the flange part 24b of the pressure-sensitive body 24, and extends and contracts the pressure-sensitive body 24.

By including the above-mentioned configuration, the first plunger 34 facing the center post 32b of the core 32 in the axial direction via an air gap, the second plunger 35 facing the first plunger 34 in the axial direction via an air gap, the plate 39 facing the second plunger 35 in the radial direction via an air gap, and the solenoid case 38 fitted to the plate 39 and the base member 32a of the core 32 constitute a magnetic circuit.

Moreover, between the center post 32b of the core 32 and the first plunger 34, the spring 37a which separates the first plunger 34 from the core 32 and biases it to a direction in which the main valve 27b is opened is arranged. Moreover, between the first plunger 34 and the second plunger 35, the spring 37b which biases the first plunger 34 and the second plunger 35 to a direction in which they are separated is arranged. The biasing force of the spring 37b acts to the second rod 36 in a direction in which the pressure-sensitive body 24 extends.

Moreover, to an inner peripheral part of the base member 32a of the core 32, an open end part of the plunger case 40 is sealingly fixed, and to an outer peripheral part of the base member 32a, the solenoid case 38 is sealingly fixed. Then, the electromagnetic coil 31 is arranged in a space surrounded by the plunger case 40, the base member 32a of the core 32 and the solenoid case 38, and does not contact the refrigerant, therefore it is possible to prevent reduction in insulation resistance.

The operation of the capacity control valve 1 having the configuration described above will be described. In addition, the flow passage leading to the first communication passage 11 through the intermediate communication passage 26 from the third communication passage 13 is hereinafter described as a "Pc-Ps flow passage". Moreover, a flow passage leading to the third communication passage 13 through the valve hole 17 from the second communication passage 12 is hereinafter described as a "Pd-Pc flow passage".

Firstly, a state that the solenoid 30 is energized and the operation of the valve body 20 will be described. At first, in a non-energized state, the first plunger 34 is pushed up by the biasing force of the spring 37a, and the second plunger 35 is also pushed up by the biasing force of the spring 37b. Thereby, the main valve 27b is fully opened, the shutoff valve 27a is fully closed, and the auxiliary valve 27c is closed.

Next, the solenoid 30 begins to be energized from the non-energized state. In the state shown in FIG. 2, that is, a low-current state, the first plunger 34 is attracted to the center post 32b, and the first rod 33 is gradually driven in an advancing direction (a direction in which the first rod 33 protrudes outside from the end part 32c of the core 32). In the low-current state, the biasing force of the spring 37b between the first plunger 34 and the second plunger 35 is set larger than the biasing force of the spring 37a between the center post 32b and the first plunger 34, and therefore the position of the second plunger 35 is hardly changed. Thereby, the valve body 20 connected to the first plunger 34 via the first rod 33 moves downward, and therefore the shutoff valve part 21a is separated from the end part 32c of the core 32, the shutoff valve 27a is opened from the fully closed state, and the main valve 27b is gradually narrowed from the fully open state. On the other hand, the second rod 36 connected to the second plunger 35 is hardly moved, and therefore the auxiliary valve 27c is maintained in the closed state.

Further, when the current supplied to the solenoid 30 is increased, the solenoid 30 is in a state shown in FIG. 3, that is, a high-current state. In the high-current state, the magnetic attractive force of the solenoid 30 is larger than the biasing force of the spring 37b, the core side end part 34a of the first plunger 34 is attracted to the plunger side end part 32e of the center post 32b, and the second plunger end part 35a is attracted to the second plunger side end part 34b of the first plunger 34. Thereby, the valve body 20 connected to the first plunger 34 via the first rod 33 moves further downward, the shutoff valve part 21a is fully opened, and the main valve 27b is fully closed. On the other hand, the second rod 36 connected to the second plunger 35 relatively moves downward with respect to the valve body 20, and presses the flange part 24b of the pressure-sensitive body 24, and the auxiliary valve 27c is fully opened.

Next, the operation of the valve body 20 in a control state of the capacity control valve 1 will be described. FIG. 2 shows the state of the capacity control valve in the control state. The control state is a state that: the solenoid 30 is controlled to the low-current state, the auxiliary valve 27c is closed, the opening of the main valve 27b is set to a predetermined certain opening, and the pressure of the suction chamber of the variable capacity compressor is controlled so as to be a set value Pset. In this state, the fluid at the suction pressure Ps passed through the first communication passage 11, the first valve chamber 14 and the shutoff valve 27a from the suction chamber of the variable capacity compressor is guided to the interior space 28 through the intermediate communication passage 26 and the adapter through hole 23c of the adapter 23, and the pressure-sensitive body 24 extends and contracts according to the suction pressure Ps. Moreover, in the low-current state, the second plunger 35 is hardly moved and the first plunger 34 is moved, and therefore the valve body 20 stops at a position where the force by the spring 37a in a direction in which the main valve 27b is opened, the force by the solenoid 30 in a direction in which the main valve 27b is closed, and the force by the pressure-sensitive body 24 which extends and contracts according to the suction pressure Ps are balanced, and the pressure of the suction chamber of the variable capacity compressor is controlled so as to be the set value Pset. However, even if the opening of the main valve 27b is set to the predetermined opening, the pressure Ps of the suction chamber may vary due to disturbance and the like with respect to the set value Pset. For example, when the pressure Ps of the suction chamber is increased than the set value Pset due to disturbance and the like, the pressure-sensitive body 24 contracts, and the opening of the main valve 27b is reduced. Thereby, the Pd-Pc flow passage is narrowed, and therefore the amount of the refrigerant at the discharge pressure flowing into the crank chamber from the discharge chamber is reduced, and the pressure of the crank chamber is reduced. As a result, the inclination angle of the swash plate of the compressor is increased, the discharge capacity of the compressor is increased, and the discharge pressure is reduced. To the contrary, when the pressure Ps of the suction chamber is decreased than the set value Pset, the pressure-sensitive body 24 extends, and the opening of the main valve 27b is increased. Thereby, Pd-Pc flow passage is increased, and therefore the amount of the refrigerant at the discharge pressure Pd flowing into the crank chamber from the discharge chamber is increased, and the pressure of the crank chamber is increased, and consequently the inclination angle of the swash plate of the compressor is decreased, the discharge capacity is reduced, and the discharge pressure is increased. In this way, by the capacity control valve 1, the pressure of the suction chamber of the variable capacity compressor can be controlled so as to be the set value Pset.

Next, the operation of the valve body 20 in the liquid refrigerant discharge state of the capacity control valve 1 will be described based on FIG. 3. The liquid refrigerant (the refrigerant which is liquefied by being cooled during standing) is accumulated in the crank chamber after the compressor is stopped for a long time, and therefore in order to secure the predetermined discharge pressure and discharge flow rate after the compressor is started, the liquid refrigerant needs to be discharged as quickly as possible. At the time of the liquid refrigerant discharge, the main valve 27b is controlled to the closed state, the pressure of the third valve chamber 16 communicating with the crank chamber and the suction pressure Ps become high pressure, and therefore the pressure-sensitive body 24 contracts to a large extent, and the auxiliary valve 27c is opened. Also in this state, it is possible to discharge the liquid refrigerant through the Pc-Ps flow passage from the crank chamber to the suction chamber. However, the pressure of the third valve chamber 16 and the suction pressure Ps are gradually reduced as discharge of the liquid refrigerant is advanced, and therefore the opening of the auxiliary valve 27c is gradually reduced, and it takes a long time to complete discharge of the liquid refrigerant. Then, the solenoid 30 is controlled to the high-current state, the second plunger end part 35a is attracted to the second plunger side end part 34b of the first plunger 34, the flange part 24b of the pressure-sensitive body 24 is pressed by the valve side end part 36b of the second rod 36, and the auxiliary valve 27c is controlled to the fully open state. Thereby, the auxiliary valve 27c is maintained in the fully open state, and therefore it is possible to discharge the liquid refrigerant from the crank chamber via the Pc-Ps flow passage to the suction chamber in a short time without changing the opening of the auxiliary valve 27c from the start of discharge of liquid refrigerant to the completion of discharge of liquid refrigerant.

In the capacity control valve 1 of the first embodiment, if the solenoid 30 is operated in the low-current state, the position of the second plunger 35 is hardly changed, only the first plunger 34 is driven, and the pressure of the suction chamber of the variable capacity compressor can be controlled so as to be the set value Pset by setting the opening of the main valve 27b to the predetermined opening. Moreover, if the solenoid 30 is operated in the high-current state, the second plunger end part 35a is attracted to the second plunger side end part 34b of the first plunger 34, the flange part 24b of the pressure-sensitive body 24 is pressed by the valve side end part 36b of the second rod 36, and the auxiliary valve 27c can be made into the fully open state, and therefore it is possible to discharge the liquid refrigerant from the crank chamber via the Pc-Ps flow passage to the suction chamber in a short time without changing the opening of the auxiliary valve 27c from the start of discharge of liquid refrigerant to the completion of discharge of liquid refrigerant. In this way, it is possible to drive different valves of the capacity control valve according to current and to operate the variable capacity compressor in different functions.

Second Embodiment

Next, a capacity control valve 2 according to a second embodiment will be described referring to FIG. 4 to FIG. 6. The capacity control valve 2 of the second embodiment is different from the first embodiment in the configurations of the first plunger and the second plunger of the solenoid. In addition, the same components as the components indicated in the above embodiment are denoted by the same reference signs, and redundant descriptions will be omitted.

Figure 4:
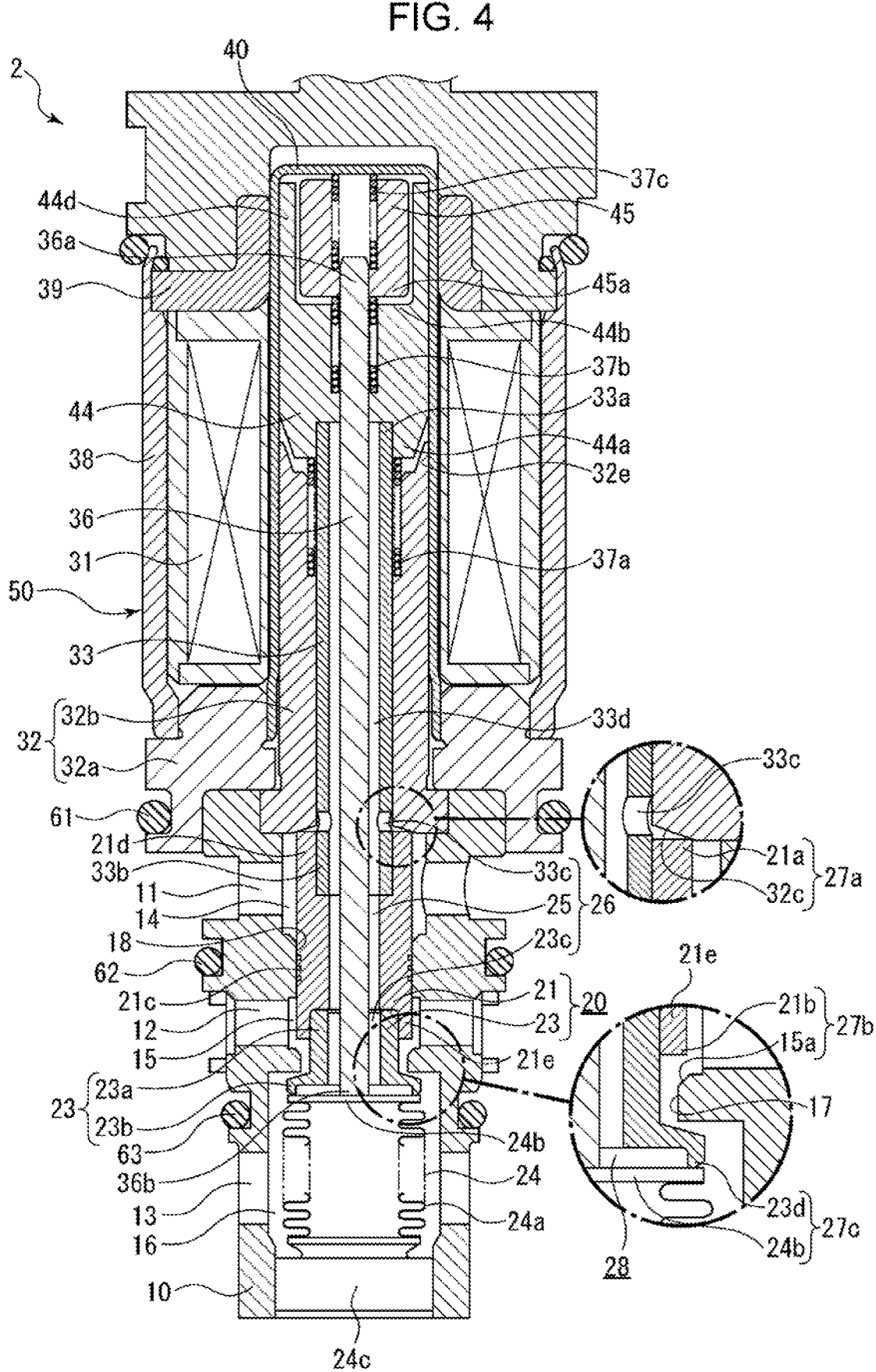
FIG. 4 is a front cross-sectional view of the capacity control valve according to a second embodiment of the present invention, and shows a state that the capacity control valve is OFF.

Referring to FIG. 4, a solenoid 50 of the capacity control valve 2 of the second embodiment will be described. The solenoid 50 mainly consists of a first plunger 34 having the first rod 33, a second plunger 45 having the second rod 36, the plate 39, the core 32 arranged between the second plunger 45 and the valve main body 10, the electromagnetic coil 31 arranged between the plate 39 and the core 32, the spring 37a (the first biasing member according to the present invention) arranged between the core 32 and the first plunger 44, the spring 37b (the second biasing member according to the present invention) arranged between the first plunger 44 and the second plunger 45, the plunger case 40 which contains the first plunger 44 and the second plunger 45, and the solenoid case 38. The solenoid 50 is supplied with power from the outside via a terminal part (not shown), generates an electromagnetic force according to current, and drives the first plunger 44 connected to the first rod 33 and the second plunger 45 connected to the second rod 36. Hereinafter, the components constituting the solenoid 50 will be described.

The plunger case 40 is the bottomed hollow cylindrical member whose one end is opened. The core 32 consists of the base member 32a and the center post 32b. The plunger case 40 and the core 32 are fitted, and the first plunger 44 and the second plunger 45 are arranged relatively movably axially with respect to the plunger case 40 between the plunger case 40 and the center post 32b of the core 32.

The first rod 33 is arranged to penetrate the center post 32b of the core 32, the solenoid side end part 33a of the first rod 33 is fitted and fixed to a core side end part 44a of the first plunger 44, the valve side end part 33b is fitted and fixed to the shutoff valve part side end part 21d of the main valve body 21, and the first rod 33 relatively moves to the center post 32b and drives the main valve body 21. Moreover, the second rod 36 is arranged to penetrate the first plunger 44, the first rod 33 and the valve body 20, the solenoid side end part 36a of the second rod 36 is fitted to a second plunger end part 45a, the valve side end part 36b of the second rod 36 is arranged so as to be able to contact the flange part 24b of the pressure-sensitive body 24, and the second rod 36 relatively moves to the first plunger 44, the first rod 33 and the valve body 20, presses the flange part 24b of the pressure-sensitive body 24, and extends and contracts the pressure-sensitive body 24.

The first plunger 44 is a cylindrical member, the tapered core side end part 44a faces the plunger side end part 32e of the center post 32b in the axial direction via an air gap, and a planar second plunger side end part 44b faces the end part 45a of the second plunger 45 in the axial direction via an air gap. Further, in an outer peripheral part of the second plunger side end part 44b of the first plunger 44, a peripheral wall 44d is provided in a standing manner, an inner peripheral surface of the peripheral wall 44d faces an outer peripheral surface of the second plunger 45 in the radial direction via an air gap, and an outer peripheral surface of the peripheral wall 44d faces the plate 39 in the radial direction via an air gap.

By including the above-mentioned configuration, the solenoid 50 has two parallel magnetic circuits. That is, a first magnetic circuit consists of the first plunger 44 facing the center post 32b of the core 32 in the axial direction, the plate 39 facing the peripheral wall 44d of the first plunger in the radial direction, and the solenoid case 38 fitted to the plate 39 and the base member 32a of the core 32. On the other hand, a second magnetic circuit consists of the core side end part 44a of the first plunger 44 facing the center post 32b of the core 32 in the axial direction, the end part 45a of the second plunger 45 facing the second plunger side end part 44b of the first plunger 44 in the axial direction, the peripheral wall 44d of the first plunger 44 facing the outer peripheral surface of the second plunger 45 in the radial direction, the plate 39 facing the peripheral wall 44d of the first plunger 44 in the radial direction, and the solenoid case 38 fitted to the plate 39 and the base member 32a of the core 32. Then, the magnetic resistance of the first magnetic circuit is smaller than the magnetic resistance of the second magnetic circuit.

Moreover, between the center post 32b of the core 32 and the first plunger 44, the spring 37a which separates the first plunger 44 from the core 32 and biases it to a direction in which the main valve 27b is opened is arranged. Moreover, between the first plunger 44 and the second plunger 45, the spring 37b which biases the first plunger 44 and the second plunger 45 to a direction in which they are separated is arranged. The biasing force of the spring 37b acts to the second rod 36 in a direction in which the pressure-sensitive body 24 extends.

Next, in the capacity control valve 2, a state that the solenoid 50 is energized and the operation of the valve body 20 will be described. At first, in a non-energized state, the first plunger 44 is pushed up by the biasing force of the spring 37a, and the second plunger 45 is also pushed up by the biasing force of the spring 37b. Thereby, the main valve 27b is fully opened, the shutoff valve 27a is fully closed, and the auxiliary valve 27c is closed.

Next, when the solenoid 50 begins to be energized from the non-energized state, the magnetic flux generating in the solenoid 50 flows to the first magnetic circuit and the second magnetic circuit. However, the magnetic resistance of the first magnetic circuit is smaller than the magnetic resistance of the second magnetic circuit, and therefore in the low-current state, most of magnetic flux generating in the solenoid 50 flows to the first magnetic circuit. As a result, as shown in FIG. 5, the first plunger 44 is attracted to the center post 32b of the core 32, but the second plunger 45 is hardly attracted to the first plunger 44. Further, the biasing force of the spring 37b between the first plunger 44 and the second plunger 45 is set larger than the biasing force of the spring 37a between the center post 32b and the first plunger 44, and therefore the position of the second plunger 45 is hardly changed. Thereby, the valve body 20 connected to the first plunger 44 via the first rod 33 moves downward, the shutoff valve part 21a is separated from the end part 32c of the core 32, the shutoff valve 27a is opened from the fully closed state, and the main valve 27b is gradually narrowed from the fully open state. On the other hand, the second rod 36 connected to the second plunger 45 is hardly moved, and therefore the auxiliary valve 27c is maintained in the closed state.

Further, when the current supplied to the solenoid 50 is increased and the solenoid 50 becomes in the high-current state, the magnetic flux generating in the solenoid 50 largely flows to also the second magnetic circuit. As a result, as shown in FIG. 6, the magnetic attractive force between the first plunger 44 and the second plunger 45 is larger than the biasing force of the spring 37b, the first plunger 44 is attracted to the center post 32b, and the second plunger 45 is attracted to the first plunger 44. Thereby, the valve body 20 connected to the first plunger 44 via the first rod 33 moves further downward, the shutoff valve part 21a is fully opened, and the main valve 27b is fully closed. On the other hand, the second rod 36 connected to the second plunger 45 relatively moves downward with respect to the valve body 20, and presses the flange part 24b of the pressure-sensitive body 24, and the auxiliary valve 27c is fully opened.

Figure 5:
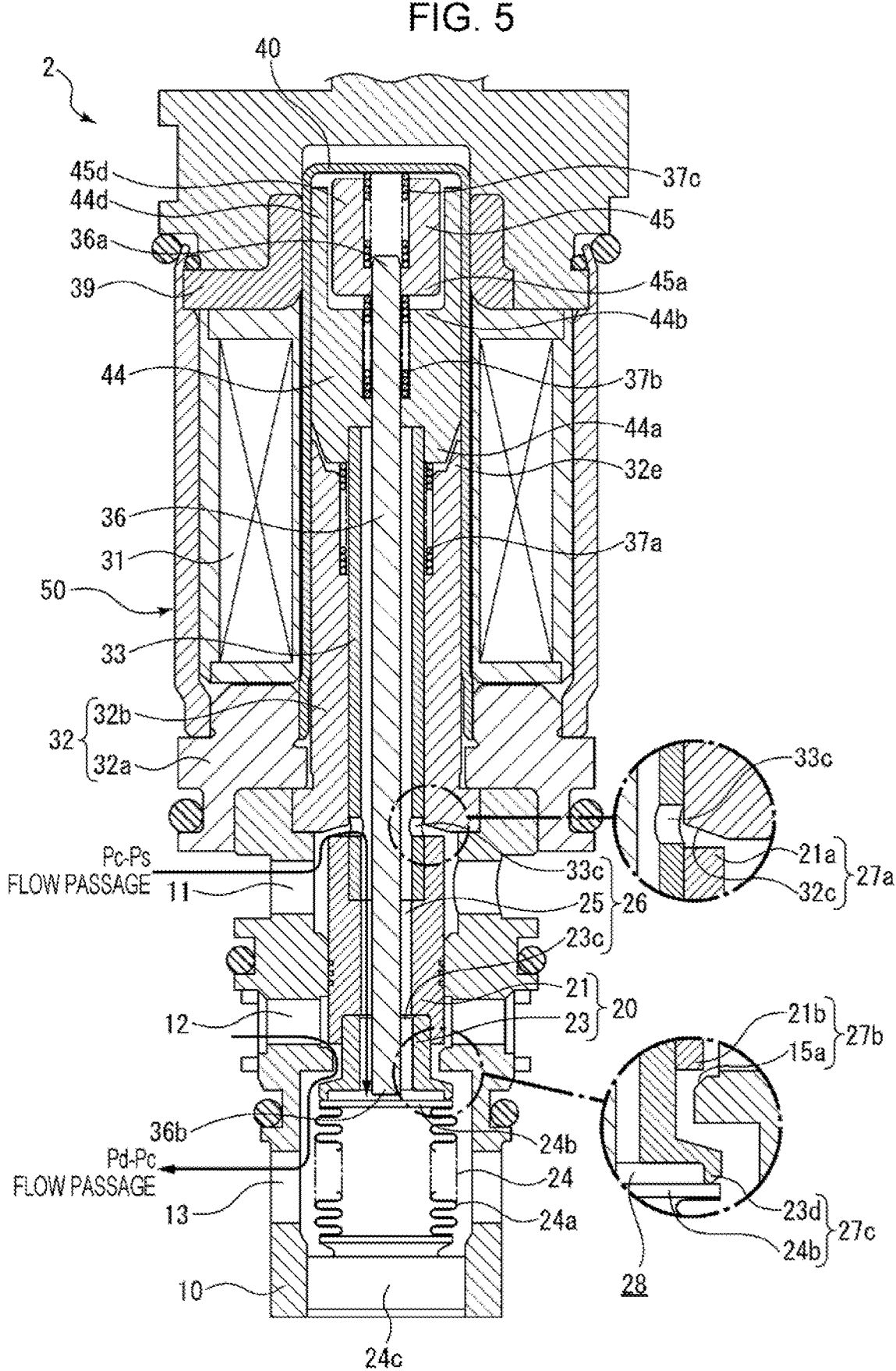
FIG. 5 is a front cross-sectional view of the capacity control valve according to the second embodiment of the present invention, and shows a state that the capacity control valve is controlled.
Figure 6:
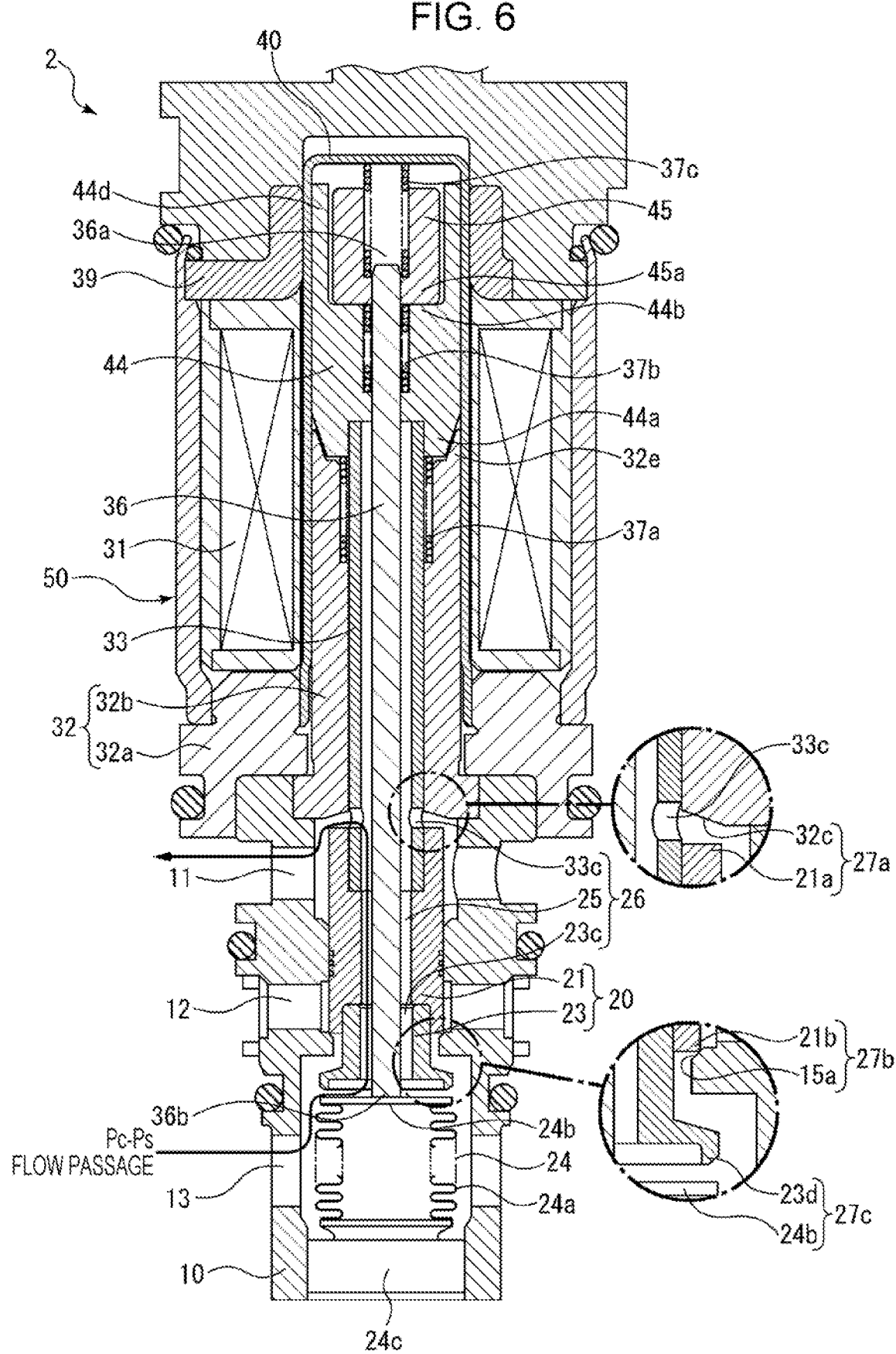
FIG. 6 is a front cross-sectional view of the capacity control valve according to the second embodiment of the present invention, and shows a state that the capacity control valve discharges the liquid refrigerant.
Figure 8:
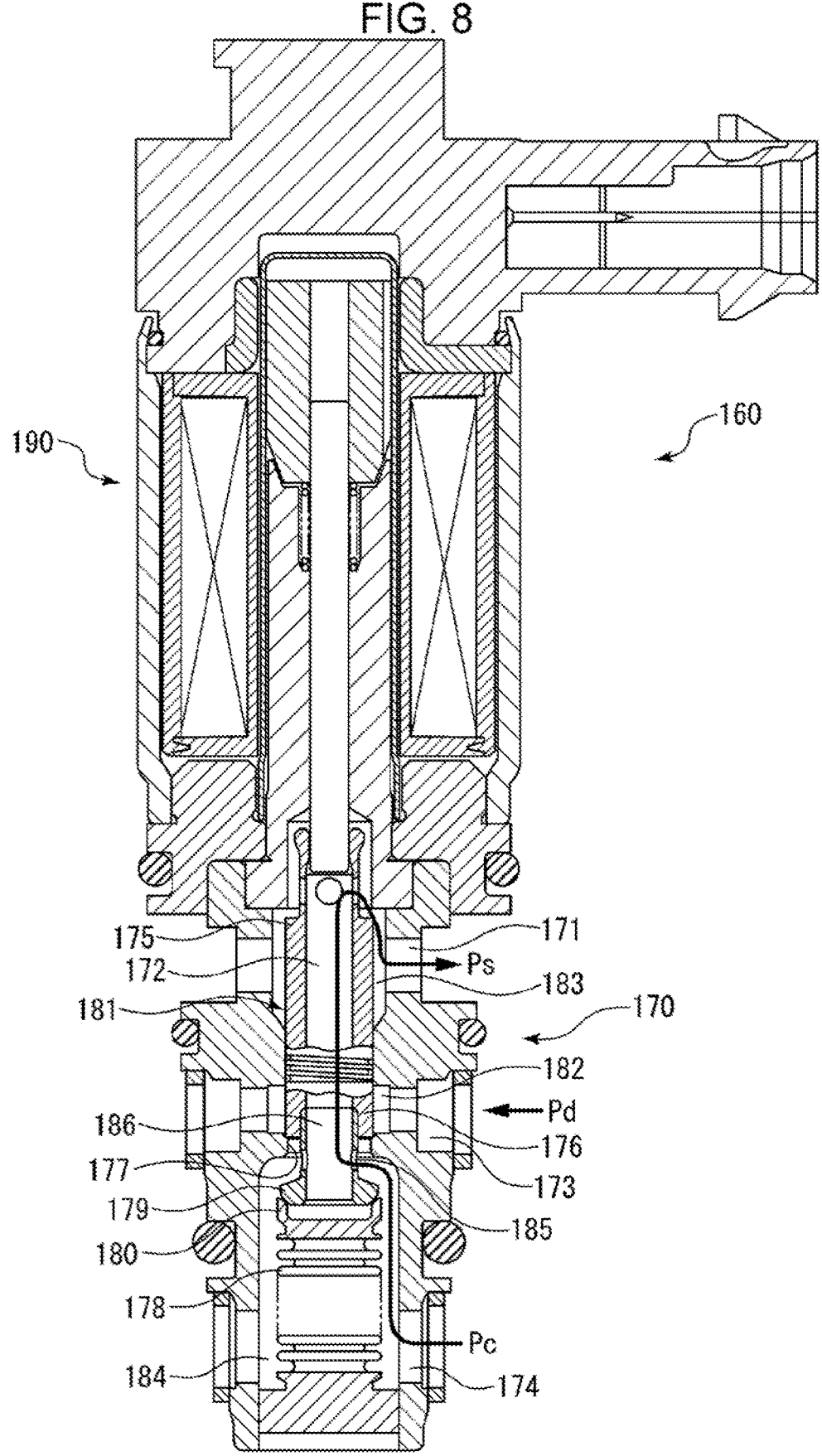
FIG. 8 is a front cross-sectional view showing the conventional capacity control valve.
Figure 9:
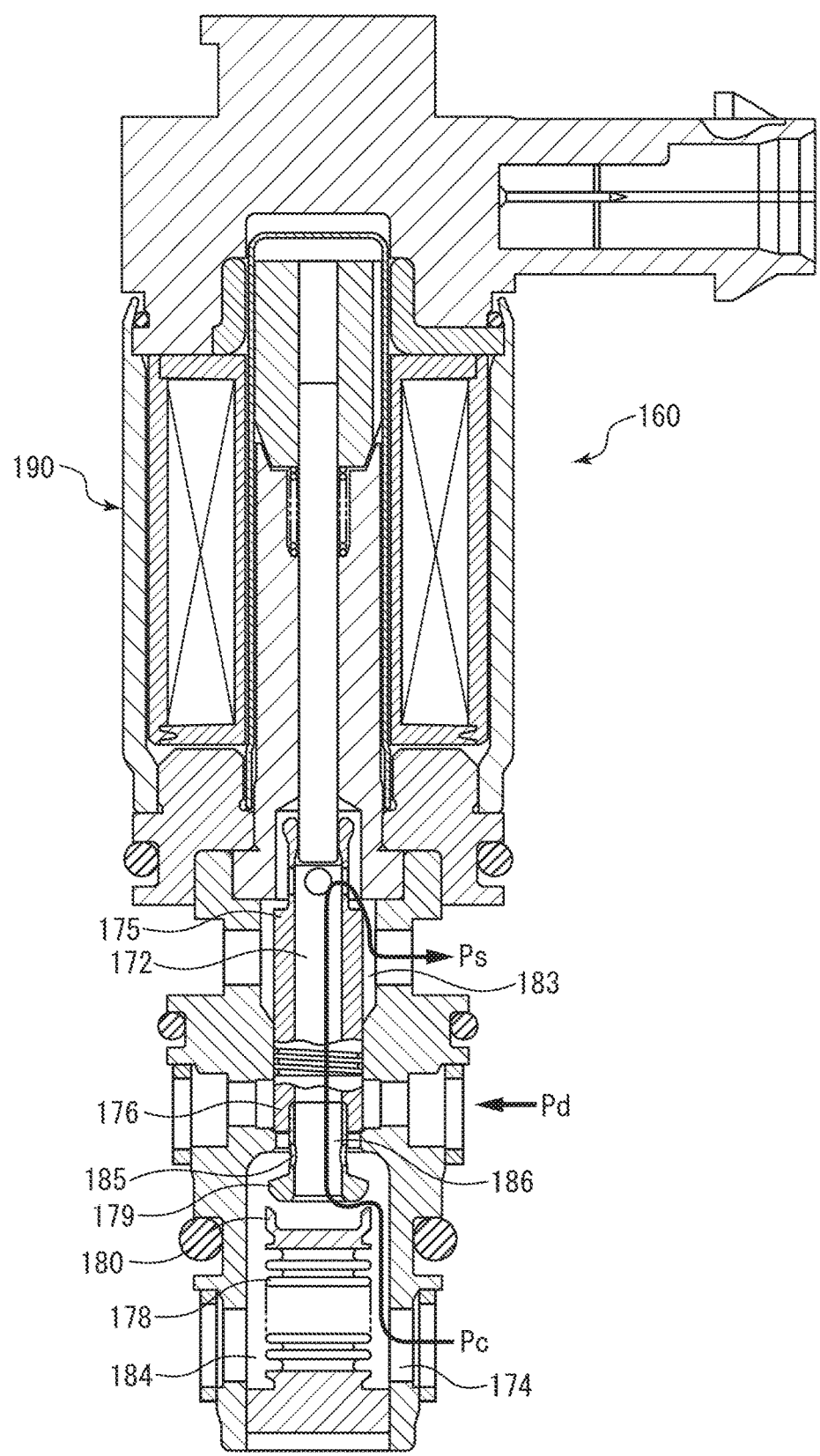
FIG. 9 is a diagram of the conventional capacity control valve, and shows a state that the capacity control valve discharges the liquid refrigerant.

As with the first embodiment, also in the second embodiment, in the low-current state of FIG. 5, the first plunger 44 is driven, the opening of the main valve 27b is set to the predetermined opening, and thereby it is possible to control the pressure of the suction chamber of the variable capacity compressor to be the set value Pset. Moreover, in the high-current state of FIG. 6, the second plunger end part 45a is attracted to the second plunger side end part 44b of the first plunger 44 and the second rod 36 is driven downward, the flange part 24b of the pressure-sensitive body 24 is pressed by the valve side end part 36b of the second rod 36, and thereby the auxiliary valve 27c can be made into the fully open state. Thereby, it is possible to discharge the liquid refrigerant from the crank chamber via the Pc-Ps flow passage to the suction chamber in a short time without changing the opening of the auxiliary valve 27c from the start of discharge of liquid refrigerant to the completion of discharge of liquid refrigerant.

Hereinbefore, although the embodiments of the present invention have been described by the drawings, its specific configuration is not limited to these embodiments, and any changes and additions made without departing from the scope of the present invention are included in the present invention.

In the above embodiment, the auxiliary valve 27c consists of the auxiliary valve part 23d provided at the adapter 23 and the flange part 24b of the pressure-sensitive body 24, but the present invention is not limited thereto. For example, as shown in FIG. 7, an auxiliary valve 70 may consist of the adapter 23, and an auxiliary valve seat 71 provided at the second rod 36. As shown in FIG. 7A, when the solenoid is OFF, the shutoff valve part 21a of the main valve body 21 is fully closed, the main valve part 21b is fully opened, and the auxiliary valve 70 is closed. In contrast, as shown in FIG.

7B, in the high-current state of the solenoid, the main valve body 21 and the adapter 23 move downward, the shutoff valve part 21a is fully open, and the main valve part 21b is fully closed, and further, the second rod 36 and the auxiliary valve seat 71 relatively move downward with respect to the main valve body 21 and the adapter 23, and press the flange part 24b of the pressure-sensitive body 24, and thereby the auxiliary valve 70 can be made into the fully open state.

Moreover, in the above embodiments, the first pressure is the suction pressure Ps of the variable capacity compressor, the second pressure is the discharge pressure Pd of the variable capacity compressor, and the third pressure is the pressure Pc of the crank chamber of the variable capacity compressor, but these are not limited thereto, and the first pressure may be the pressure Pc of the crank chamber of the variable capacity compressor, the second pressure may be the discharge pressure Pd of the variable capacity compressor, the third pressure may be the suction pressure Ps of the variable capacity compressor, and thus the capacity control valve can correspond to various variable capacity compressors.

REFERENCE SIGNS LIST 1 capacity control valve
2 capacity control valve
10 valve main body
11 first communication passage
12 second communication passage
13 third communication passage
14 first valve chamber
15 second valve chamber
15a main valve seat
16 third valve chamber
17 valve hole
20 valve body
21 main valve body
21a shutoff valve part
21b main valve part
21c labyrinth
23 adapter
23d auxiliary valve part
24 pressure-sensitive body
24a bellows
24b flange part
25 through hole
26 intermediate communication passage
27a shutoff valve
27b main valve
27c auxiliary valve
28 interior space
29 intermediate communication passage
30 solenoid
31 electromagnetic coil
32 core
33 first rod
34 first plunger
35 second plunger
36 second rod
37a spring (first biasing member)
37b spring (second biasing member)
38 solenoid case
39 plate
40 plunger case
44 first plunger
45 second plunger
50 solenoid 70 auxiliary valve
71 auxiliary valve seat
Fsol magnetic attractive force
Ps suction pressure (first pressure) (third pressure)
Pd discharge pressure
Pc control chamber pressure (third pressure) (first pressure)
Pset suction pressure set value

The invention claimed is:

1. A capacity control valve for controlling a flow rate or pressure of a variable capacity compressor according to a valve opening of a valve section, the capacity control valve comprising:
a valve main body having a first communication passage through which a fluid at a first pressure passes, a second communication passage which is arranged adjacent to the first communication passage and through which a fluid at a second pressure passes, a third communication passage through which a fluid at a third pressure passes, and a main valve seat arranged in a valve hole for communicating the second communication passage and the third communication passage;
a pressure-sensitive body which is arranged in the valve main body on the third communication passage side and which extends and contracts in response to ambient pressure;
a valve body having an intermediate communication passage for communicating the first communication passage and the third communication passage, a main valve part for opening and closing the valve hole by separating from and contacting the main valve seat, and an auxiliary valve part arranged in the intermediate communication passage; and
a solenoid including a first plunger having a first rod, and a second plunger having a second rod, wherein
the intermediate communication passage is formed in the valve body, and
a shutoff valve for opening and closing between the first communication passage and the intermediate communication passage is arranged on the solenoid side in the intermediate communication passage, and
the auxiliary valve part is arranged between the valve body and the pressure-sensitive body in the intermediate communication passage, and that
the first rod opens and closes the main valve part and the second rod opens and closes the auxiliary valve part.

2. The capacity control valve according to claim 1, wherein the first plunger is arranged between the second plunger and the valve main body.

3. The capacity control valve according to claim 1, wherein the second rod is arranged in the intermediate communication passage.

4. The capacity control valve according to claim 1, wherein:
the solenoid further includes a plate, a core arranged between the second plunger and the valve main body, an electromagnetic coil arranged between the plate and the core, a first biasing member arranged between the core and the first plunger, and a second biasing member arranged between the first plunger and the second plunger; and
a biasing force of the second biasing member is larger than a biasing force of the first biasing member.

5. The capacity control valve according to claim 4, wherein the first plunger faces the plate in a radial direction.

6. The capacity control valve according to claim 1, wherein the auxiliary valve part opens and closes the intermediate communication passage by separating from and contacting the pressure-sensitive body.

7. The capacity control valve according to claim 1, wherein the auxiliary valve part opens and closes the intermediate communication passage by separating from and contacting an auxiliary valve seat arranged at the second rod.

8. The capacity control valve according to claim 1, wherein:
the first pressure is a suction pressure of the variable capacity compressor, the second pressure is a discharge pressure of the variable capacity compressor, and the third pressure is a pressure of a crank chamber of the variable capacity compressor.

9. The capacity control valve according to claim 1, wherein:
the first pressure is a pressure of a crank chamber of the variable capacity compressor, the second pressure is a discharge pressure of the variable capacity compressor, and the third pressure is a suction pressure of the variable capacity compressor.

10. A method for controlling the capacity control valve according to claim 1, wherein the main valve part and the auxiliary valve part are opened and closed individually.

11. A method for controlling the capacity control valve according to claim 1, wherein the main valve part and the auxiliary valve part are opened and closed individually according to current supplied to the solenoid.

12. The capacity control valve according to claim 2, wherein the second rod is arranged in the intermediate communication passage.

13. The capacity control valve according to claim 2, wherein:
the solenoid further includes a plate, a core arranged between the second plunger and the valve main body, an electromagnetic coil arranged between the plate and the core, a first biasing member arranged between the core and the first plunger, and a second biasing member arranged between the first plunger and the second plunger; and
a biasing force of the second biasing member is larger than a biasing force of the first biasing member.

14. The capacity control valve according to claim 2, wherein the auxiliary valve part opens and closes the intermediate communication passage by separating from and contacting the pressure-sensitive body.

15. The capacity control valve according to claim 2, wherein the auxiliary valve part opens and closes the intermediate communication passage by separating from and contacting an auxiliary valve seat arranged at the second rod.

16. The capacity control valve according to claim 2, wherein:
the first pressure is a suction pressure of the variable capacity compressor, the second pressure is a discharge pressure of the variable capacity compressor, and the third pressure is a pressure of a crank chamber of the variable capacity compressor.

17. The capacity control valve according to claim 2, wherein:
the first pressure is a pressure of a crank chamber of the variable capacity compressor, the second pressure is a discharge pressure of the variable capacity compressor, and the third pressure is a suction pressure of the variable capacity compressor.

18. A method for controlling the capacity control valve according to claim 2, wherein the main valve part and the auxiliary valve part are opened and closed individually.

19. A method for controlling the capacity control valve according to claim 2, wherein the main valve part and the auxiliary valve part are opened and closed individually according to current supplied to the solenoid.

* * * * *